Dec. 2, 1969     A. E. RODELY     3,481,196

SENSOR ORIENTATION IN FLOWMETERS

Filed Sept. 28, 1967     2 Sheets-Sheet 1

INVENTOR.
ALAN E. RODELY
BY
Jefferson Ehrlich
ATTORNEY

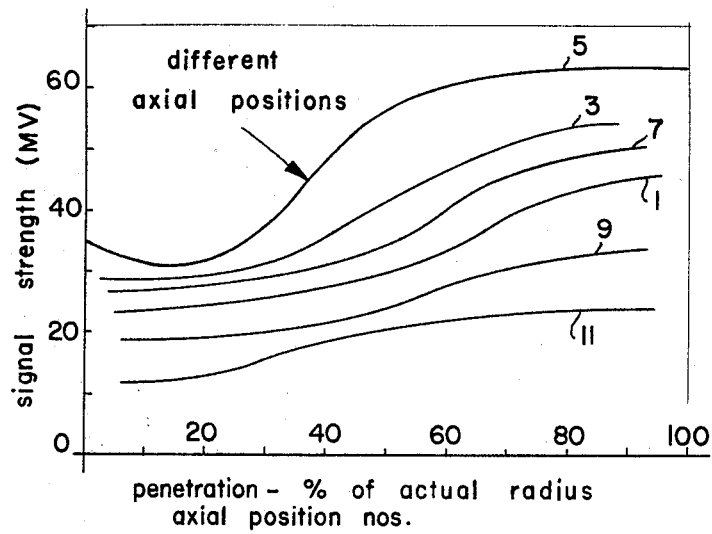
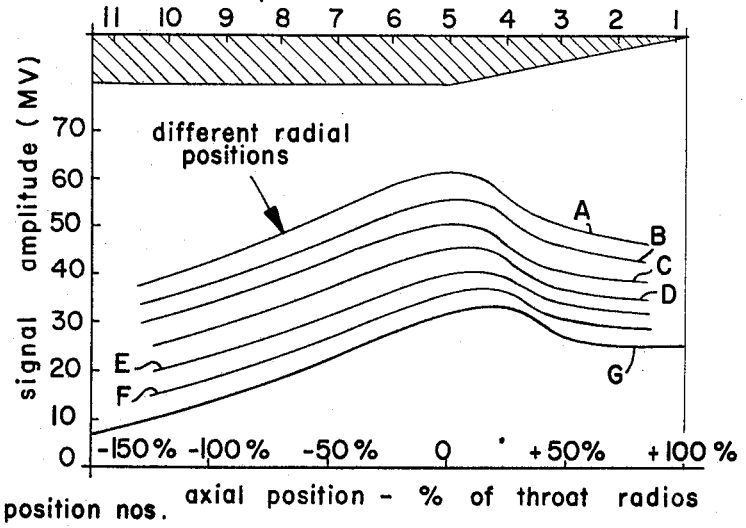
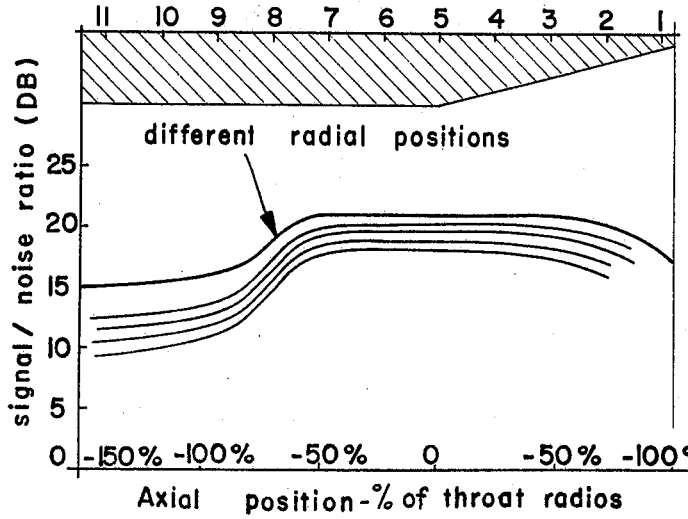

United States Patent Office 3,481,196
Patented Dec. 2, 1969

3,481,196
SENSOR ORIENTATION IN FLOWMETERS
Alan E. Rodely, Scotch Plains, N.J., assignor to American Standard Inc., New York, N.Y., a corporation of Delaware
Filed Sept. 28, 1967, Ser. No. 671,439
Int. Cl. G01f 1/04
U.S. Cl. 73—194         11 Claims

ABSTRACT OF THE DISCLOSURE

This invention discloses an improved arrangement to sense periodic parameter variations occurring in precessing or oscillating fluids. Generally, transducers are direction sensitive and, unless properly oriented with respect to the flow and placed in a region where the parameter variations of pressure, velocity or temperature are optimum, the transducers will fail to respond significantly. The failure to respond depends not only on the lack of suitable orientation of the transducer relative to the varying parameters, but also on account of the continuous spectrum of noise introduced by the turbulent fluid. This invention reveals the solutions to these problems and sets up definitive criteria to render swirl-type flowmeters operative when they would otherwise fail and to improve their operation.

---

This invention relates to volumetric or mass flow measuring devices, sometimes called swirl-type flowmeters, and more particularly, the invention relates to sensors or related devices which may be employed to detect oscillations or precession of the fluid and hence the volume, or the changes in the volume, of fluid flowing through a flowmeter.

Figure 4:
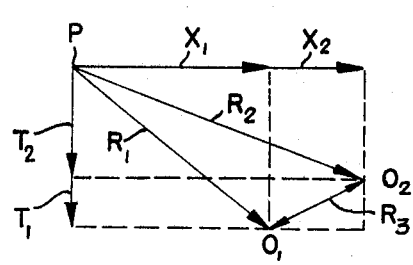

In the R. C. Chanaud Patent No. 3,279,251, issued Oct. 18, 1966, assigned to the same assignee, there is shown a form of flowmeter that may be used in determining and measuring the quantity of fluid flowing through a conduit, such as a pipe. FIG. 4 of that patent, part of which is reproduced in this application, for explanatory purposes, shows three sections of pipe, one section of which, of one diameter, is coupled to a second section of pipe of a smaller diameter and the second section in turn is coupled to a third pipe, which may be of the same diameter as the first section of pipe. A form of swirl means, such as a blade structure and, more particularly, a stationary or immovable blade structure, may be positioned in the first section of pipe in order to introduce a swirl into the fluid traversing the second section of pipe. When the fluid enters the third or enlarged pipe section, the swirling fluid will undergo a form of precession, which may be regarded as an oscillation, and the fluid precession or oscillation may serve as a medium to detect the amount of fluid that is flowing through the pipe in a given amount of time. The third section of pipe may, if desired, embody a so-called de-swirl blade structure, which may also be stationary or immovable, to reinstate in a large degree the non-swirling condition to the fluid into the piping system beyond, that is, downstream of the de-swirl blade structure. This will enable the fluid to return to its former state, materially reducing the turbulence previously introduced by the swirling and precessing mechanism into the stream of fluid and isolating the flowmeter from downstream disturbances.

In the above-mentioned Chanaud patent, various forms of sensors have been described which may be employed for detecting changes in the parameters of the fluid traversing the piping system. These sensors were, for example, thermal sensors which, in general, respond to velocity variations and piezo-electric sensors which respond to pressure variations; and other sensory forms were described.

The present invention is specifically directed to the form of the sensor mechanism, and especially to its orientation, for sensing the periodic parameter variations occurring in the precessing or oscillating fluid which is involved in a mechanism of the type shown in the above mentioned Chanaud patent.

The sensor is an important component of the overall system because it must be accurately responsive to the precessing or oscillating variations. Each oscillation of the fluid should be detected and transformed into an electrical pulse. Hence, the form of the sensor, and its particular location in the fluid medium, can be and frequently is critically important to an operative and efficient fluid sensing or measuring arrangement.

In analysing the invention, it is necessary to observe that the precessing or oscillatnig fluid is accompanied by various significant coincidental physical changes, among which the fundamental and most important may be pressure changes, velocity changes and temperature changes. All of these several changes are, in general, simultaneously present. The sensing mechanism must be capable of responding in a high degree of accuracy to any one of these fluid parameters and of transforming the parameter into a corresponding electrical pulse. The more accurately responsive the sensing mechanism is, the more perfect will be the results acquired with the use of the sensing mechanism.

One of the objects of this invention is to obtain the largest signal, or one of the largest signals, from the parameters of the fluid and to accurately fix the position of the sensing component for such a signal, that is, its range or area along the axial direction of travel of the fluid so as to achieve the best results from the measuring mechanism. As will be shown hereinafter, it will be essential to select the region in the axial path of travel of the fluid undergoing oscillation or precession.

Another of the objects of this invention will be to obtain the best signal, or one of the best signals, and to determine, in an appropriate region, where the corresponding oscillation or precession occurs, that is, the depth of insertion of the sensing mechanism for a particular installation. This invention will be concerned with the selection of the radial dimensions of the range in which best results are obtained and, in that range, the accuracy of the equipment will be optimum.

Still another object of this invention is to determine the optimum angular orientation of the sensing mechanism for the best signal or one of the best signals with respect to the piping mechanism and with respect to the path of the precessing or oscillating fluid, especially if the sensing mechanism is one that may have different degrees of sensitivity in different orientations. By carefully choosing the angular orientation in relation to signal strength, this will also have a material effect upon the accuracy of the measuring results achieved. On the other hand, an improper choice in the angular orientation may be fatal to the operability of the mechanism, however sensitive all other components of the mechanism may be.

Some of the operating principles that are employed in connection with this invention will now be referred to. If a fluid is flowing in an equipment of the kind, for example, shown and described in the above-mentioned Chanaud patent, a sensor device may be inserted into almost any region of the mechanism where precession or oscillation occurs and there will necessarily be present a fluctuating fluid, that is, fluid fluctuating in pressure, in velocity and perhaps in temperature, which will create a so-called signal of a frequency which will be, in an important degree, in correspondence with the volume of the fluid passing through the piping mechanism. The signal will have different levels which depend, in large degree, on the volume of the fluid flow and on its density and on the contours and proportions of the swirl mechanism and of the piping mechanism. The magnitude of the signal will be highly variable, depending on such contours and physical dimensions of the mechanism but depending, far more importantly, on, for example, the location and orientation of the sensing mechanism in the piping structure. Accompanying the signal, however, there will be noise inherently present due to the turbulence of the flow in the region where precession or oscillation occurs. This inherent noise may be so large as to mask or nullify the signal and this is so especially if the sensor is not appropriately positioned in the overall combination so as to pick up the signal at a level which is high relative to the noise level. Hence, it is clear from this that the orientation of the sensor in the cavity where the troublesome factors are inherently involved can make the difference between success and failure in the proper operation of any flowmeter.

In order to emphasize the features of the invention, it is noted that the noise accompanying the swirl and precession is a masking or nullifying factor in the overall measurement scheme, and the sensor must be positioned so as to detect a signal of relatively large level which will be readily distinguishable from the noise and therefore separately measurable. However, if the signal is relatively weak because of inappropriate positioning of the sensor mechanism, the noise level may be significantly large compared to the signal, perhaps even larger than the signal, in which case the signal will be irretrievable and lost forever. The sensor must be positioned so as to respond under conditions which take into account the signal-to-noise ratio of the mechanism. Otherwise the flowmeter may become valueless.

Another important factor involves the depth of penetration of the sensing mechanism in the piping system in the region where oscillation or precession occurs. It has been found from experiment that there are regions, for example, in the line perpendicular to the longitudinal dimension of the piping system, where the signal level is much greater, sometimes three or four times as great as, it is in other regions in the same vertical or perpendicular disposition. Thus, it is important to properly select a level or depth of insertion of the sensing mechanism, that is, select a point or region where the signal will have a relatively large order of magnitude compared to the noise level. Thus, the depth of the penetration of the sensor should be carefully chosen for the efficient operation of a flowmeter.

It has also been found that the positioning of the sensing mechanism along the longitudinal or horizontal axis of the piping system, that is, its position with respect to the beginning or ending of the oscillating or precessing fluid, may be a significant point in obtaining the signal of greatest amplitude. In accordance with this invention, this longitudinal factor has also been determined and is employed to materially inprove the operation and efficiency of flowmeter apparatus.

Hence, this invention generally involves the selection of parts of the regions where oscillation or precession occurs and orienting the sensing mechanism with respect to such regions of the fluid transmission to achieve the best results.

Figure 1:
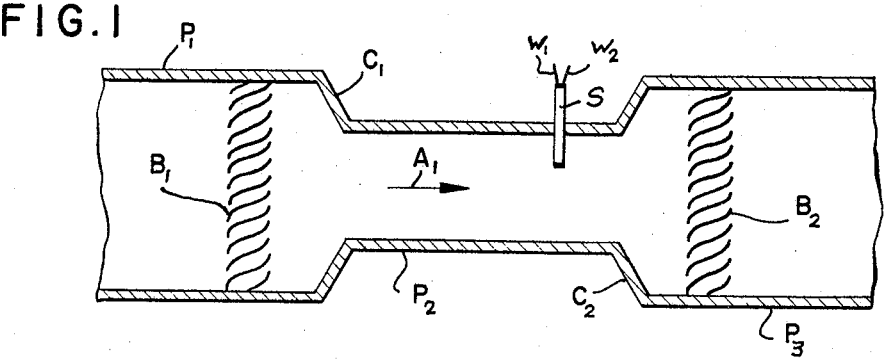
Figure 2:
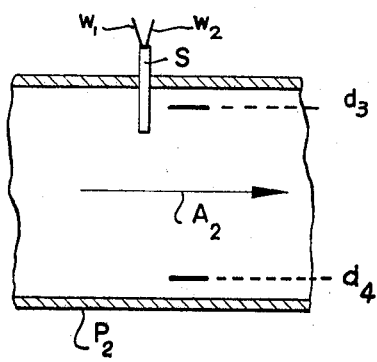
Figure 3:
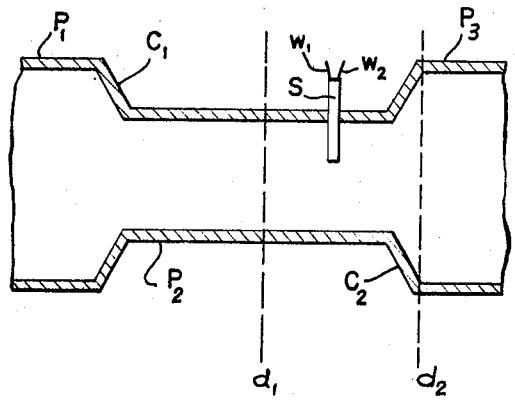
Figure 5:
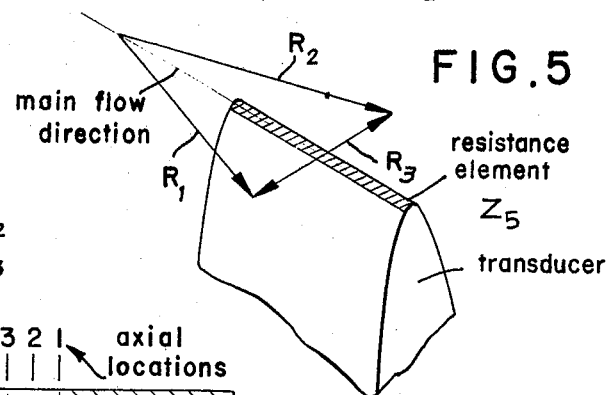
Figure 6A:
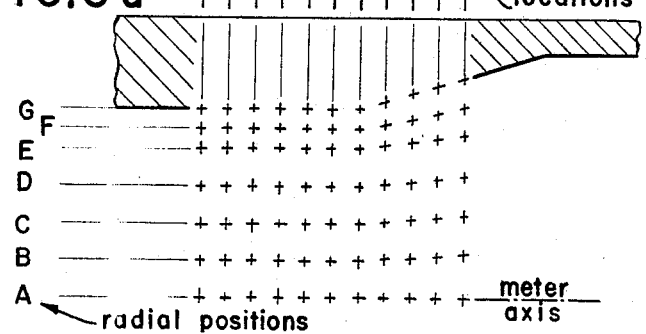

This invention will be better understood from the more detailed description hereinafter following, when read in connection with the accompanying drawing, in which FIG. 1 illustrates schematically a swirl meter mechanism to which the sensor features of this invention may be applied; FIG. 2 shows schematically the regions where the depth of penetration of the sensing mechanism may be most significant; FIG. 3 is intended to schematically illustrate the relative axial or longitudinal position of the sensor mechanism for best results; FIG. 4 illustrates a diagram of certain vectors employed for illustrating some of the features of this invention; FIG. 5 shows a form of terminus for a sensor having a linearly disposed resistive element which is to be oriented in the fluid for achieving optimum results; FIG. 6a shows a testing arrangement for determining the optimum sensor positions, and FIGS. 6b, 6c and 6d show curves relating to the testing arrangement. Similar reference characters will be used to illustrate or refer to similar elements or components. The invention, although described in some detail in this specification, is to be measured principally by the scope of the appended claims.

Referring to FIG. 1 of the drawing, there are shown three pipe sections, P1, P2 and P3, in which the pipe section P2 has a smaller cross-sectional area or diameter than pipe sections P1 and P3. Pipe sections P1 and P2 are coupled to each other by a coupler C1, which may be tapered as shown, and pipe sections P2 and P3 are coupled to each other by a similar coupler C2 which may also be tapered as shown. There may be inserted a fixed or immovable blade structure B1 which is positioned, for example, near the entrance to the coupler C1. The blade structure B1 will introduce a swirl of a substantially constant pitch into the fluid, whether gas or liquid, which traverses in the longitudinal or axial direction A1 through pipe section P2. As the fluid enters the enlarged segment of pipe section P3, the swirling flow will be converted into a precessing or oscillating flow. The precessing or oscillating flow will then travel downstream through pipe section P3 where it may, for example, encounter a second blade structure B2 which may serve to deswirl the fluid. By so deswirling the fluid, the fluid will be returned to substantially the same or initial condition that prevailed before it encountered the initial blade structure B1 which introduced the swirling action. It will be apparent, of course, that the pipe sections P1 and P3 may be of the same diameter or cross-section. Also, the various pipe sections and their couplers may be circular, square, rectangular, or of any other cross-sectional shapes or configurations as may be desired. The couplers C1 and C2 may be tapered at any angle and the contours of the couplers may have any appropriate shapes and should conform to the shapes of the pipe sections P1, P2 and P3.

Inserted in the pipe section P2 there is a sensor S which may be, for example, a thermal sensor. A thermal sensor will usually include a resistive element of any well-known type which is electrically heated so that it responds to the precessing or oscillating fluid. The resistance variations of the element will generate a voltage variation which may be transmitted over conductors W1 and W2 to a measuring instrument (not shown) which will indicate, on a substantially linear scale, a quantity which will be proportional to the flow rate. That is, it may respond to the quantity of fluid per unit of time that has traversed the piping arrangement.

It will be observed that, as shown in FIG. 1, the sensor S is immediately upstream of the coupler C2 and in the region of the pipe section P2. The sensor S may, if desired, be located in any longitudinal position between blade structures B1 and B2, but preferably near the expanded area downstream at the end of pipe section P2. It may be located near the longitudinal center of pipe section P2, that is, about half-way downstream along pipe section P2, or it may be located in any part of pipe section P2. It may also be positioned within the regions of couplers C1 and C2 or even wthin the pipe section P3 which is adjacent to coupler C2.

As already explained, the position of the sensor S is critically important in the operation of the flowmeter. If the position of the sensor S is not properly chosen, it has been found that the results read on the meter connected to conductors W1 and W2 will be in error. The resultant readings may, for example, merely indicate the turbulence or noise level or some combination of the signal and noise levels.

As also already explained, the fluid precesses at a given frequency. The frequency of the signal created by the precessing fluid, sometimes called the "signal frequency," will be the same anywhere in the interconnecting piping structure where the signal is detectable. However, the turbulence or noise accompanying the signal frequency can be of relatively large magnitude and, for useful operation of the meter, it is necessary that the signal be readily distinguishable from the noise. To the extent that the noise substantially equals or exceeds the signal component, the signal component will become masked or completely nullified. Hence, it is important to arrange and position the sensor mechanism so that the signal will be larger than and readily distinguishable from the noise component.

The frequency of the signal arising from precession or oscillation is detectable by means of an electronic arrangement such, for example, as is shown and described in a co-pending application of Charles L. McMurtrie, Ser. No. 653,855, filed July 17, 1967, entitled "Automatic Filter Selector," and assigned to the same assignee. In that arrangement, a group of electric wave filters are employed with other apparatus to select the channel in which the signal component is relatively large compared to the noise component and to amplify and render visible a numerical quantity corresponding to the signal frequency component.

Although, as already explained, the sensor S may have a fairly good position in the relative location shown in FIG. 1, there is considerable room for variation of the position in the longitudinal or axial direction A1 of the pipe structure, and, within certain limits within that direction, a fairly intelligible signal frequency component may be observed. But, the best position will yield results, such as freedom from noise, which may be quantitatively several times as good as some of the fairly adjacent positions in the longitudinal or axial direction. FIG. 3, for example, signifies a range $d1$ and $d2$ within which fairly good signal detection may be obtained with an otherwise properly oriented sensor S.

In FIG. 2, for example, the lines $d3$, $d4$ represent, in effect, two belts or cylinders around the central line or axis A2 of the pipe section P2. It has been found from experimental data that, if the end of terminus bearing the resistor or detector of the sensor is located between the concentric belts $d3$ and $d4$, much better results will be obtained than if the sensor terminus were positioned above the line $d3$ or below the surface $d4$. If the position of the terminus of the sensor S substantially departs from the indicated boundaries, the results of the experiments indicate that the signal magnitude will be at a relatively low value.

There are still other special factors that must be taken into account in positioning the sensor S within the pipe mechanism. If the sensor terminus is adjacent to the inner surface of the pipe section P2, it will pick up a considerable amount of stray material which may become affixed to the terminus of the sensor, change its electrical resistance and render the results erroneous.

FIG. 4 presents a vector diagram which is submitted merely to explain some of the factors that enter into the determination of the sensor configuration and position. Here are shown two vector velocities at point P. At one moment at which the oscillation or precession is at its maximum value, the axial vector corresponding to the precessing or oscillating fluid parameter will be represented by X1. At the same moment, the tangential vector will be represented as T1. These two vectors will have a resultant R1. At another moment when the oscillation or precession is at its minimum value, the axial vector may be represented as X2 and the tangential vector as T2 and they will have a resultant R2. The resultant of the two vectors R1 and R2 will be represented by the vector R3 which indicates the magnitude and direction of the oscillation or precession.

Such a resultant R3 clearly suggests that if the sensor is direction sensitive, it should be oriented with its sensitive axis aligned parallel with the direction represented by R3. A sensor S so oriented will respond with greatest sensitivity and accuracy to the velocity variations introduced by the precessing or oscillating fluid. The voltage variations caused by the vector R3 will then be transmitted from the sensor S over the conductors W1 and W2 to the reading or recording instrument.

FIG. 5 shows the pointed end of a transducer having a linear resistance or transducer element Z5 of the kind already noted and the vectors R1, R2 and R3 have been superimposed, for illustrative purposes, to show the relative position of the resistance element Z5 with respect to the vector forces.

It will be apparent from the above, and it is significant, that it is the orientation and/or location of the transducer element Z5 with respect to the precessing or oscillation fluid path which determines what relative signal strength (if any) will be available to the recording equipment. The choice locations have already been indicated above. The strength and quality of the signal are improved, in accordance with this invention, by a judicious choice of sensor location. Furthermore, the positioning of the sensor will protect it from the damaging effects due to solid particles that may be transported through the piping system and that might present factors to interfere with the sensing characteristics of the instrument.

In one of the tests performed with a flowmeter of the kind above-described, eleven equally-spaced access holes were drilled through the wall of the flowmeter in the region where the area increase begins, as shown in FIG. 6a. FIG. 6a shows, not only the eleven axial locations, but also the various radial positions chosen for the test. The sensor was rotated about its own axis in each of the several positions to seek the best signal. A supply of air was transmitted through the meter. The flow rate produced a signal frequency of about 152 Hz.

FIGURE 6b shows a plot of the signal strength against penetration of the sensor as a percentage of the actual radius of the flowmeter cavity. FIG. 6c shows the same data plotted against the axial position as a percentage of the throat radius. FIG. 6d shows the signal-to-noise ratio plotted against the axial position also shown as a percentage of the throat radius.

The results of this test indicated that the arrangement of the sensor in a region within about four-tenths (0.4) of the radius of the axis of the flowmeter and within about five-tenths (0.5) of the radius of the start of the increase in the area of the flowmeter wall, constituted the best position for the sensor. That is, the best position of the sensor was found to lie within a cylinder having an axis coincident with the axis of the flowmeter, a diameter of eight-tenths (0.8) of the radius of the middle pipe segment P2 and a length equal to the radius of the middle pipe segment P2, the plane at the intersection of pipe segment P2 and coupler C2 dividing the cylinder into two equal parts having identical circular bases. At this position, there existed approximately the maximum available signal and the optimum signal to noise ratio.

Although this invention has been shown and described in certain particular embodiments merely for the purpose of illustration, it will be understood that the invention may be embodied in other and widely varied organizations without departing from the spirit of the invention and the scope of the appended claims.

What is claimed is:

1. The combination of a pipe structure transmitting precessing fluid, a pick-up probe which is inserted through the wall of the pipe structure so that its terminus is positioned, when measured from the inner wall of the pipe structure, at a point more than about 60 percent of the radial distance between said inner wall and the axis thereof, and a sensitive element supported on the terminus of the pick-up probe and undergoing changes proportional to the parameters of the precessing fluid.

2. The combination of claim 1, in which the sensitive element of the pick-up probe embodies a resistive element which continually produces a current or voltage the magnitude of which varies in relation to the velocity variations of the precessing fluid.

3. The combination defined by claim 2, in which the pick-up probe is positioned along the longitudinal dimension of the pipe structure at a point which will yield a signal corresponding to the precessing fluid at a level which substantially exceeds the noise level in the precessing fluid.

4. A pipe structure transmitting a precessing fluid producing a variation corresponding to the volume of fluid traversing the pipe structure, said structure including a sensor positioned along the pipe structure so as to yield a signal corresponding to the precessing rate of the fluid, said sensor having a terminus positioned from the inner wall of the pipe structure at least 60% down from the inner wall of the pipe structure toward the axis thereof, the terminus of the sensor bearing an element which is changed in magnitude in accordance with the rate of precessing fluid.

5. A pipe structure according to claim 4 in which the terminus of the sensor is positioned in longitudinal and radial positions within the pipe structure so that, in each such position separately considered, the precessing fluid will yield a large signal relatively to the noise introduced by the precessing fluid.

6. The combination of a pipe in which the fluid traversing the pipe is brought into a precessing state, and a transducer inserted into the pipe so as to respond to the parameters of the precessing fluid traversing the pipe, said transducer being inserted into the pipe away from its inner wall to a depth of at least 60 percent of the radial distance between the inner wall of the pipe and its axis.

7. The combination according to claim 6 in which the transducer is responsive to temperature variations of the precessing fluid.

8. The combination according to claim 6 in which the transducer is responsive to velocity variations of the precessing fluid.

9. The combination according to claim 6 in which the transducer is responsive to the pressure variations of the precessing fluid.

10. The combination of three tandem-connected pipes, two of large diameter and the other of smaller diameter coupled between the other two, means for swirling the fluid in the first pipe of large diameter, means positioned adjacent to the coupling between the second and third pipes to select a signal corresponding to the precessing fluid at a level which is substantially greater than the noise level of the precessing fluid, said latter means including a sensor positioned at least 60 percent down from the inner wall of the pipe of smaller diameter toward the axis thereof.

11. The combination of a pipe in which precessing fluid is generated and traveling downstream, said precessing fluid having a varying axial vector and a varying tangential vector, and a sensor oriented in said pipe structure so that it can respond substantially exclusively to the vector resulting from the variations of the axial and tangential vectors, said orientation being such that the sensitive portion of said sensor is within 0.4R of the axis of said pipe and within 0.5R of the beginning of the area increase which causes the fluid to precess, R being the radius of the pipe section preceding the area increase.

References Cited
UNITED STATES PATENTS

| | | | |
|---|---|---|---|
| 3,279,251 | 10/1966 | Chanaud | 73—194 |
| 3,314,289 | 4/1967 | Rodely | 73—194 |
| 3,370,463 | 2/1968 | Chanaud | 73—194 |
| 3,408,859 | 11/1968 | Konen | 73—54 |

RICHARD C. QUEISSER, Primary Examiner

J. K. LUNSFORD, Assistant Examiner